United States Patent [19]
Alexander et al.

[11] Patent Number: 6,027,104
[45] Date of Patent: Feb. 22, 2000

[54] SECURITY ENCLOSURE FOR CHILDREN AND PETS

[75] Inventors: Stephen R. Alexander, Blaine; Lester Stener, Coon Rapids, both of Minn.

[73] Assignee: North States Industries, Inc., Minneapolis, Minn.

[21] Appl. No.: 09/004,077

[22] Filed: Jan. 7, 1998

[51] Int. Cl.[7] .................................................. F16C 11/00
[52] U.S. Cl. .............................. 256/25; 256/26; 256/67; 16/235
[58] Field of Search .................................. 256/24, 25, 26, 256/27, 19, 67, DIG. 2; 16/236, 247, 235

[56] References Cited

U.S. PATENT DOCUMENTS

| | | | |
|---|---|---|---|
| 3,469,822 | 9/1969 | O'Brien | 256/26 X |
| 4,346,671 | 8/1982 | Wagner | 256/26 X |
| 4,562,656 | 1/1986 | Kristofich | 16/235 X |
| 4,645,183 | 2/1987 | Rattray et al. | 256/26 X |
| 4,712,773 | 12/1987 | Larson | 256/25 |
| 5,544,870 | 8/1996 | Kelley et al. | 256/25 X |
| 5,609,327 | 3/1997 | Amidon | 256/25 X |

FOREIGN PATENT DOCUMENTS

WO 88/00272  1/1988  WIPO ...................................... 16/235

*Primary Examiner*—Lynne H. Browne
*Assistant Examiner*—John R. Cottingham
*Attorney, Agent, or Firm*—Merchant & Gould P.C.

[57] ABSTRACT

A security enclosure for children and pets is disclosed which is formed from a plurality of identical interlocking panels. Each panel comprises a panel body having opposed inner and outer faces and first and second opposite sides. First and second hinge members are disposed on the first panel body side in vertically spaced relation, and a third hinge member is disposed on the second body side having a vertical dimension which corresponds to the vertical spacing of the first and second hinge members. A spring loaded engagement member holds the third hinge member in interlocking relation between the first and second hinge members. A circular array of gear teeth formed on the respective hinge members hold adjacent panels in a predetermined angular relationship and are constructed to permit relative angular adjustment between the adjacent panels. The hinge means are offset in such a manner that adjacent panels can be folded in flat, face-to-face relation.

10 Claims, 7 Drawing Sheets

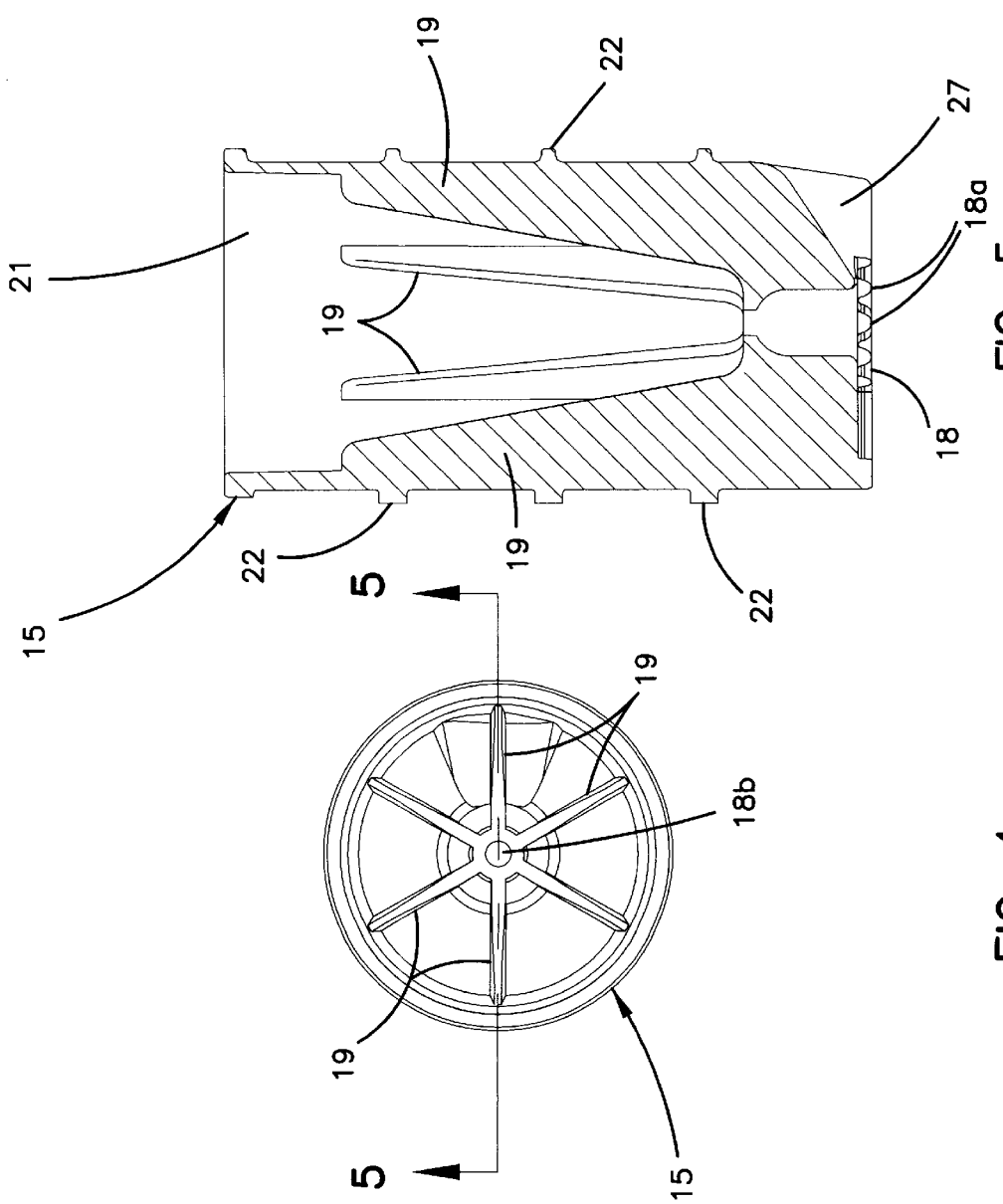

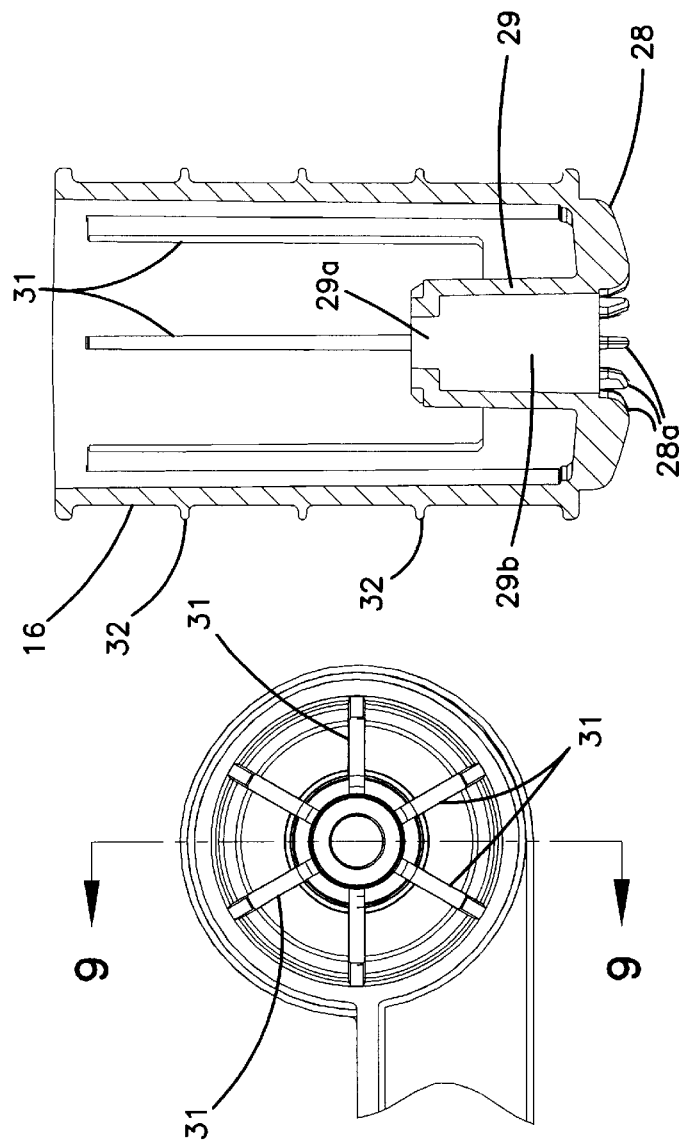
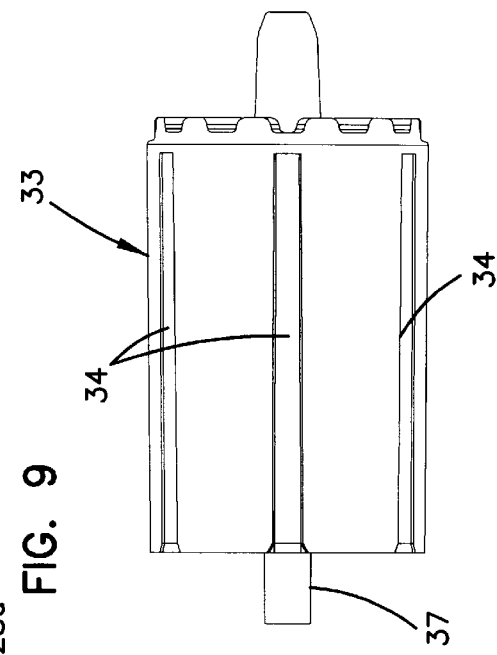
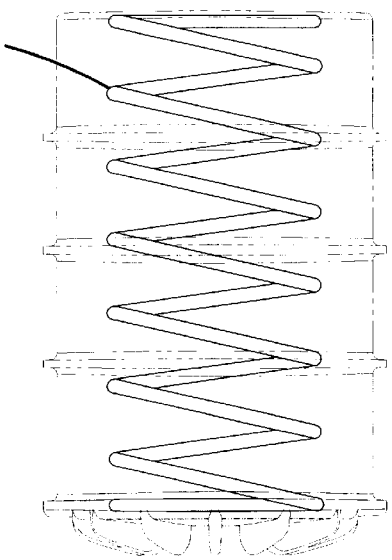
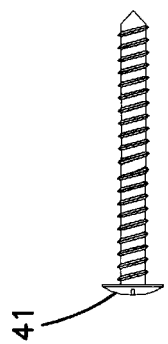

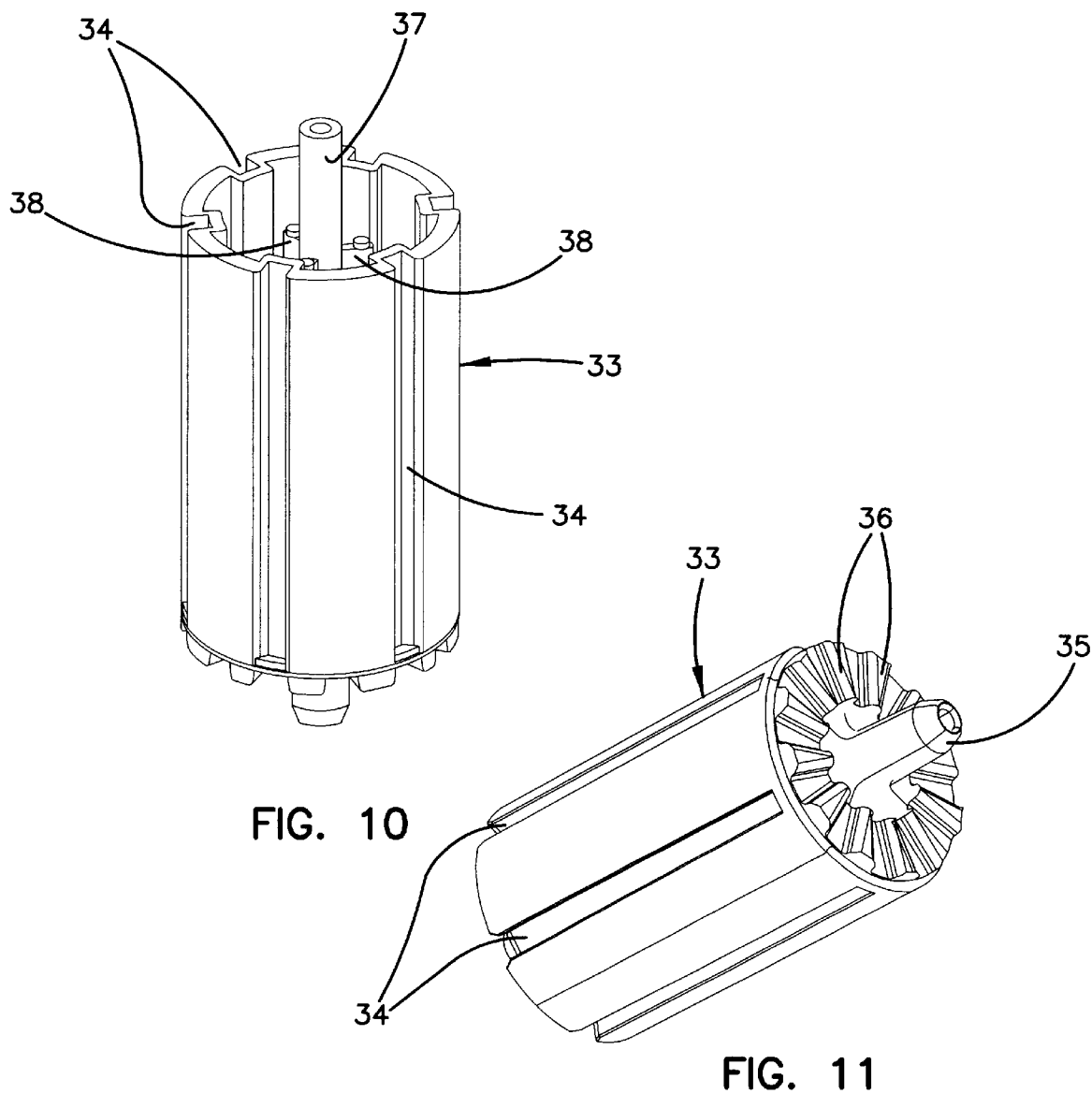
FIG. 10
FIG. 11
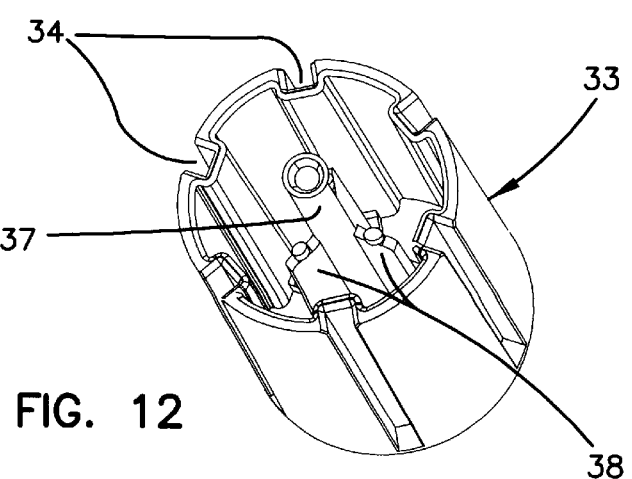
FIG. 12

SECURITY ENCLOSURE FOR CHILDREN AND PETS

The invention broadly relates to security enclosures for children and pets, and is specifically directed to a unique panel that may be used in even, interlocking multiples to form enclosures of different sizes.

Security enclosures for children and pets are well known in the prior art and exist in various forms. Variable size enclosures are also known, being accomplished through the use of multiple panels, which are typically difficult to interconnect as well as to store, or expansion-type enclosures, which are generally difficult to maneuver into a desired size, and also difficult to collapse as well as to carry and store. Expansion-type enclosures are also disadvantageous because the larger the enclosure, the shorter its height.

The subject invention is directed to a multiple panel enclosure that is highly unique in that it utilizes a single panel which may be used in even multiples to create enclosures of different size; e.g., four may be used for a square configuration, six for a hexagonal configuration and eight for a large octagonal configuration. Each panel is preferably injection molded from thermoplastic and includes a small number of moving parts.

The inventive panel utilizes an interlocking hinge assembly consisting of two hinge components on one panel side that are spaced apart by a predetermined amount, and a single hinged component on the opposite panel side that is sized to fit between the spaced hinge components on an adjacent panel. A single spring-compressed engagement member permits adjacent sides of two panels to be brought together quickly and easily in interlocking relation, as well as to be angularly adjusted relative to each other appropriate to the desired configuration.

In assembled relation, the multiple panel security enclosure is highly stable and may be used to limit the movement of even the most aggressive small child or pet. For storage purposes, only two adjacent panels need be disassembled, and all of the panels may be angularly folded in flat, face-to-face relation for easy storage.

The invention will be more fully appreciated from the accompanying drawings and specification.

BRIEF DESCRIPTION OF THE DRAWINGS

FIG. 4 is an enlarged top plan view of a first hinge portion of the panel;

FIG. 5 is a sectional view taken along the line 5—5 of FIG. 4;

FIG. 6 is an end view of a cap used for the hinge portion of FIGS. 4 and 5;

FIG. 7 is a transverse sectional view taken along the line 7—7 of FIG. 6;

FIG. 8 is an enlarged top plan view of a second hinge portion of the panel of FIG. 1;

FIG. 9 is a transverse sectional view taken along the line 9—9 of FIG. 8;

FIG. 10 is a first perspective view of a telescoping insert for the second hinge portion of FIGS. 8 and 9;

FIG. 11 is a second perspective view of the telescoping insert;

FIG. 12 is a third perspective view of the telescoping insert;

FIG. 13 is an exploded perspective view of the telescoping insert with a biasing spring and screw;

Figure 1:
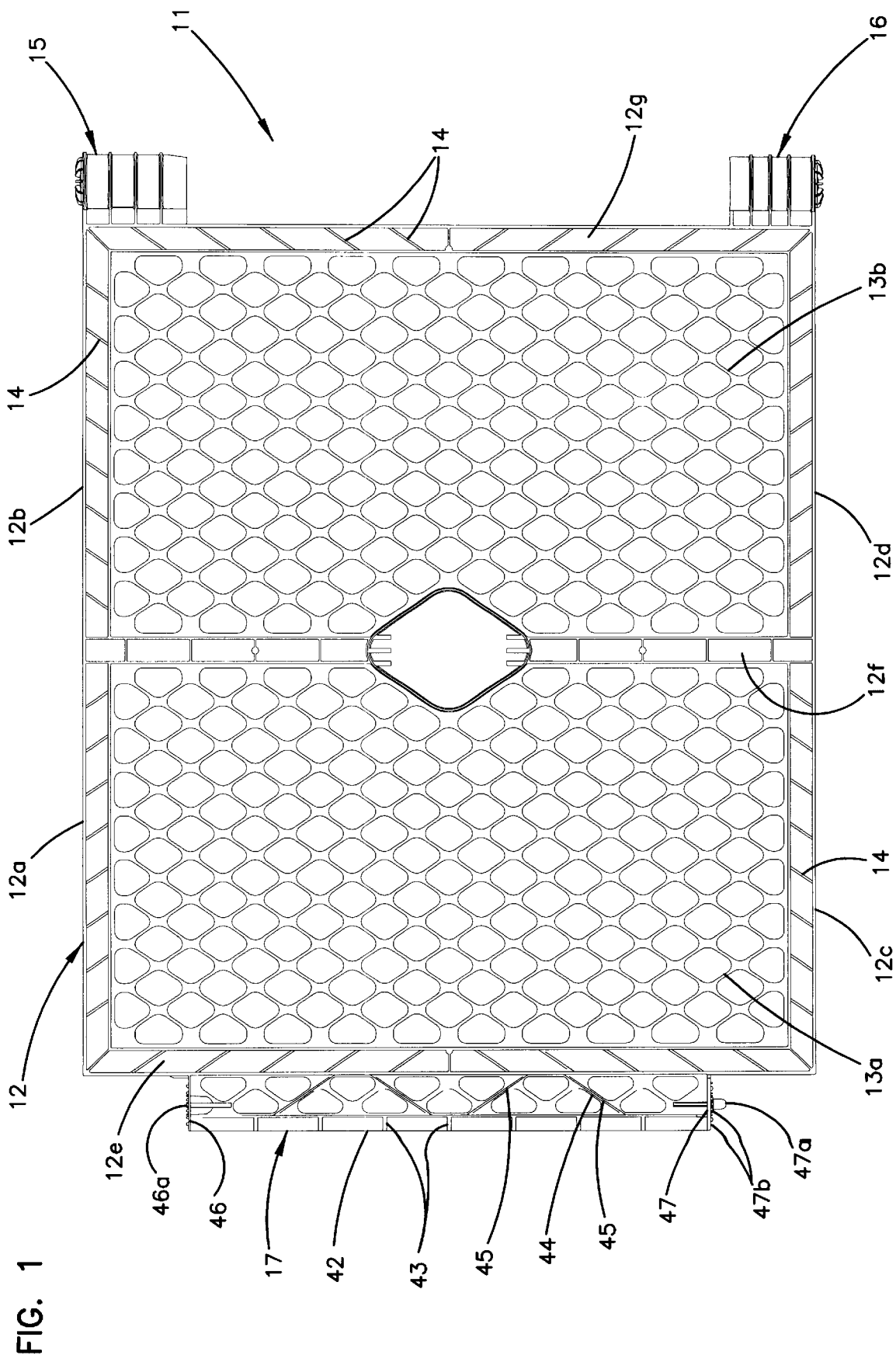
FIG. 1 is aside elevational view of a panel embodying the invention which may be used in multiples to define a play area for young children and pets.

With initial reference to FIG. 1, a panel capable of being used in multiples to define play areas of variable size is represented generally by the numeral 11. With the single exception of a steel compression spring and a single screw, both described more fully below, the entirety of panel 11 is fabricated from thermoplastic, preferably by injection molding.

Panel 11 comprises a double rectangular frame consisting of horizontal components 12a–d and interconnecting vertical components 12e–g. Integrally formed within these frame components are web portions 13a, 13b defining opposed inner and outer panel faces, which in the preferred embodiment constitute a diamond gridwork sized to prevent small children and pets from passage from the play area and also configured to reduce the likelihood of injury to small fingers and toes. In the preferred embodiment, the horizontal and vertical components 12a–g are of generally I-beam construction with reinforced angular struts 14 extending between the flanges.

Each of the panels 11 includes a hinge structure integrally formed on each of its sides. On the right side of panel 11 (i.e., on vertical frame component 12g), first and second hinge members 15 and 16 are disposed in spaced relation, extending laterally outward from the upper and lower corners, respectively, of the frame 12.

At the opposite side (i.e., on vertical frame component 12e), a single hinge member 17 projects laterally outward. As described in more specific detail below, the space between hinge members 15, 16 approximately corresponds to the length or height of hinge member 17.

The hinge members 15, 16 are generally similar in external appearance as shown in FIG. 1, but there are several structural differences as more fully appreciated in FIGS. 2–9.

With reference to FIGS. 4 and 5, hinge member 15 is generally cylindrical but internally hollow to an extent. The lower end is closed by an integrally formed end cap 18 having a plurality of radially extending gear teeth 18a. An axial opening (FIG. 4) is centrally formed in the end cap 18. The internal core of hinge member 15 includes a plurality of equiangularly disposed tapered ribs 19 that extend from the bottom longitudinally upward to a point proximate the upper open end, which bears reference numeral 21. A plurality of circumferential ribs 22 extend around hinge member 15 at spaced intervals.

With reference to FIGS. 6 and 7, a cap member 23 is sized and configured as a frictional plug for open end 21. Cap 23 includes a circumferential skirt 24 sized to fit frictionally within the inner circumferential side of open end 21. A peripheral flange 25 rests on top of the axial end of hinge member 15. A plurality of radially extending ribs 26 are equiangularly spaced around the center of end of cap 23.

Figure 3:
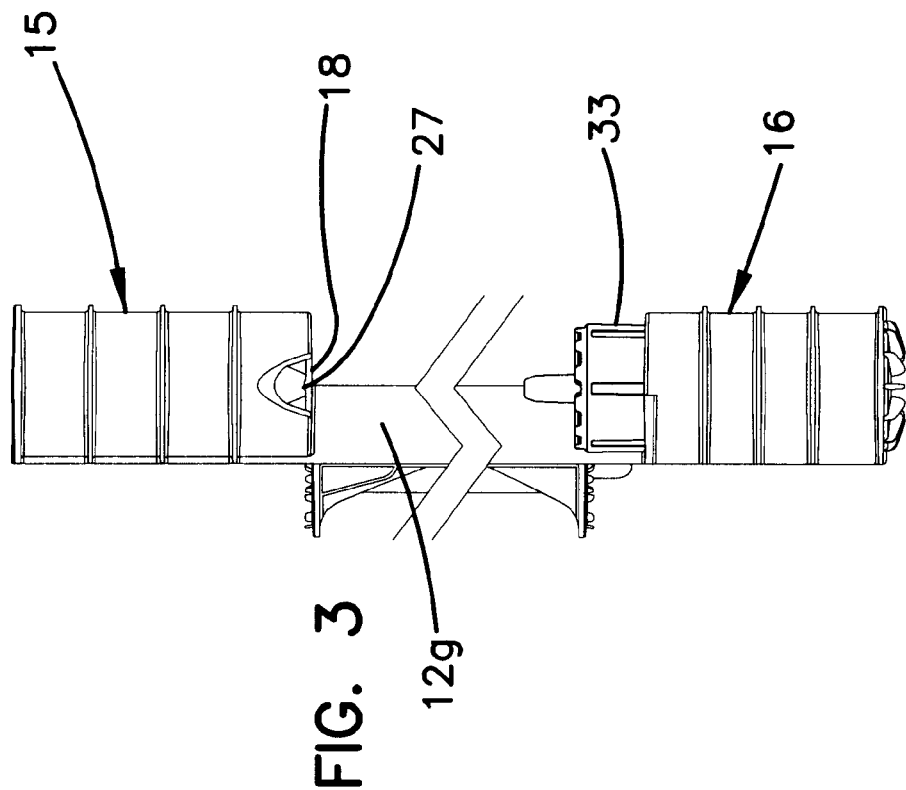
FIG. 3 is an end view of the panel as viewed from the right end of FIG. 1.

With continued reference to FIGS. 3 and 5, a tapered recess 27 is formed in the lower external side of hinge member 15 for a purpose described in further detail below.

With reference to FIG. 8 and 9, hinge member 16 comprises a generally hollow cylinder the lower end of which is closed by an integrally formed cap 28 the circular exposed surface of which defines a plurality of radially projecting ribs 28e. A short hub 29 projects upwardly from end cap 28 a short distance terminating in an and having an axial opening 29a. Extending radially outward and upward along the inner circumferential surface of hinge member 16 are equiangularly spaced ribs 31. Circumferential ribs 32 extend around the external surface of hinge member 16 in spaced intervals similar to the circumferential ribs 22 of hinge member 15.

The upper end of hinge member 16 is open and receives a telescoping, spring loaded engagement member best shown in FIGS. 10–13. As shown in these figures, engagement member 32 is generally cylindrical, having an outer diameter that is slightly less than the inside diameter of hinge member 16. Molded into its external circumferential surface are a plurality of axially extending channels 34 that are sized to receive and slide relatively over the axial ribs 31 of hinge member 16.

With reference to FIGS. 11 and 13, the lower axially end of engagement member 33 is closed. Projecting axially downward from the closed end member is an engagement pin 35 surrounded by a plurality of radially extending gear teeth 36. Gear teeth 36, as gear teeth 18 and other gear teeth described below, taper or converge radially inward, and their top edges are rounded to facilitate adjusting movement as discussed more fully below.

With reference to FIGS. 10 and 12, the opposite end of engagement member 33 is open. Projecting upwardly from its closed lower end is a spindle 37 that projects axially beyond the open end. Also projecting upwardly from the closed end of engagement member 33 are three equiangularly spaced ribs 38 that are integrally formed with spindle 37, but which terminate a predetermined distance below the open end of engagement member 33.

Spindle 37 has an outer diameter that is sized to project through the axial opening 29a in hub 29 and to slide relative thereto. The axial ribs 38 are sized and arranged to abutably engage the closed end of hub 29 and thus act as a limit stop to the degree to which engagement member 33 inwardly slides.

With additional reference to FIG. 13, a steel coil-type compression spring is sized to fit within the engagement member 33 in encircling relation to the spindle 37 and ribs 38. Spring 39 rests against the closed lower end of engagement member 33, and in its unstressed state projects beyond spindle 37.

With reference to FIG. 9, hub 29 defines a cylindrical recess 29b that extends axially from the lower end of hinge member 16. With the engagement member 33 and spring 39 is assembled relation within the hinge member 16, a screw 41 is inserted through the recess 29b and screwed into the open axial end of spindle 37, which as described above projects downward through the axial opening 29a. The head of screw 41 is larger than the opening 29a of hub 29 and thus holds the various components together in assembled relation. In the assembled relation (see FIG. 3), the engagement member 33 may be slidably forced downward into the hinge member 16 for a purpose described in further detail below.

Figure 2:
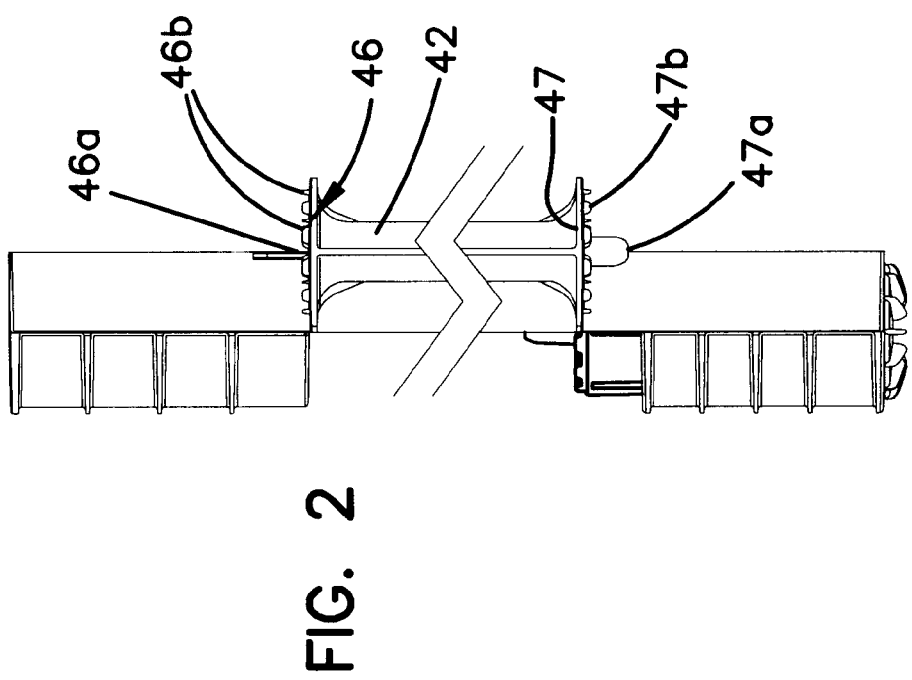
FIG. 2 is an end view of the panel as viewed from the left end of FIG. 1.

The hinge member 17 is best shown in FIGS. 1 and 2. It includes an external frame member 42 which is T-shaped in transverse cross section with a plurality of reinforcing ribs 43 spaced over its length. Extending between the outer edge of vertical frame component 12e and the frame member 42 is a web portion 44 having a plurality of angular braces 45 extending therebetween. The web portion 44 is configured and has openings the same as web portions 13a,b.

The upper end of hinge member 17 is formed with a circular flange member 46 defining an axially extending central recess 46a surrounded by a plurality of radially extending gear teeth 46b. The gear teeth are constructed to interlockably engage with the gear teeth 36 of the engagement member 33.

At the lower end of hinge member 17 is a circular flange member 47 similar in size to the flange member 46. It is formed with a centrally disposed, axially extending spindle 47a encircled by a plurality of radially extending gear teeth 47b. The gear teeth 47b are constructed to interlockably engage the gear teeth 18a on hinge member 15.

Figure 14:
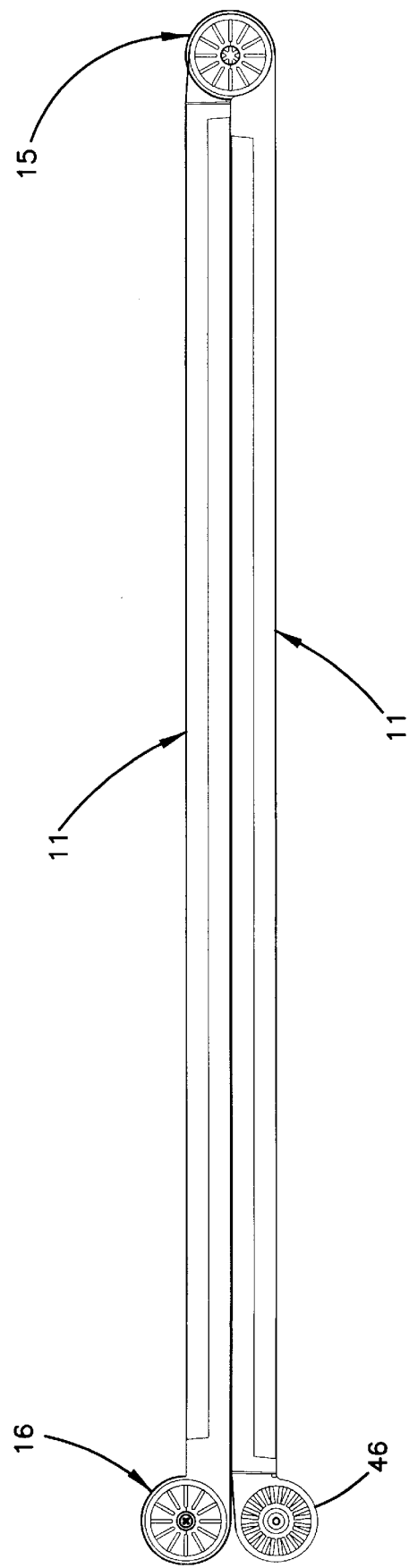
FIG. 14 is a top plan view of two interlocked panels folded face-to-face for storage.
Figure 15:
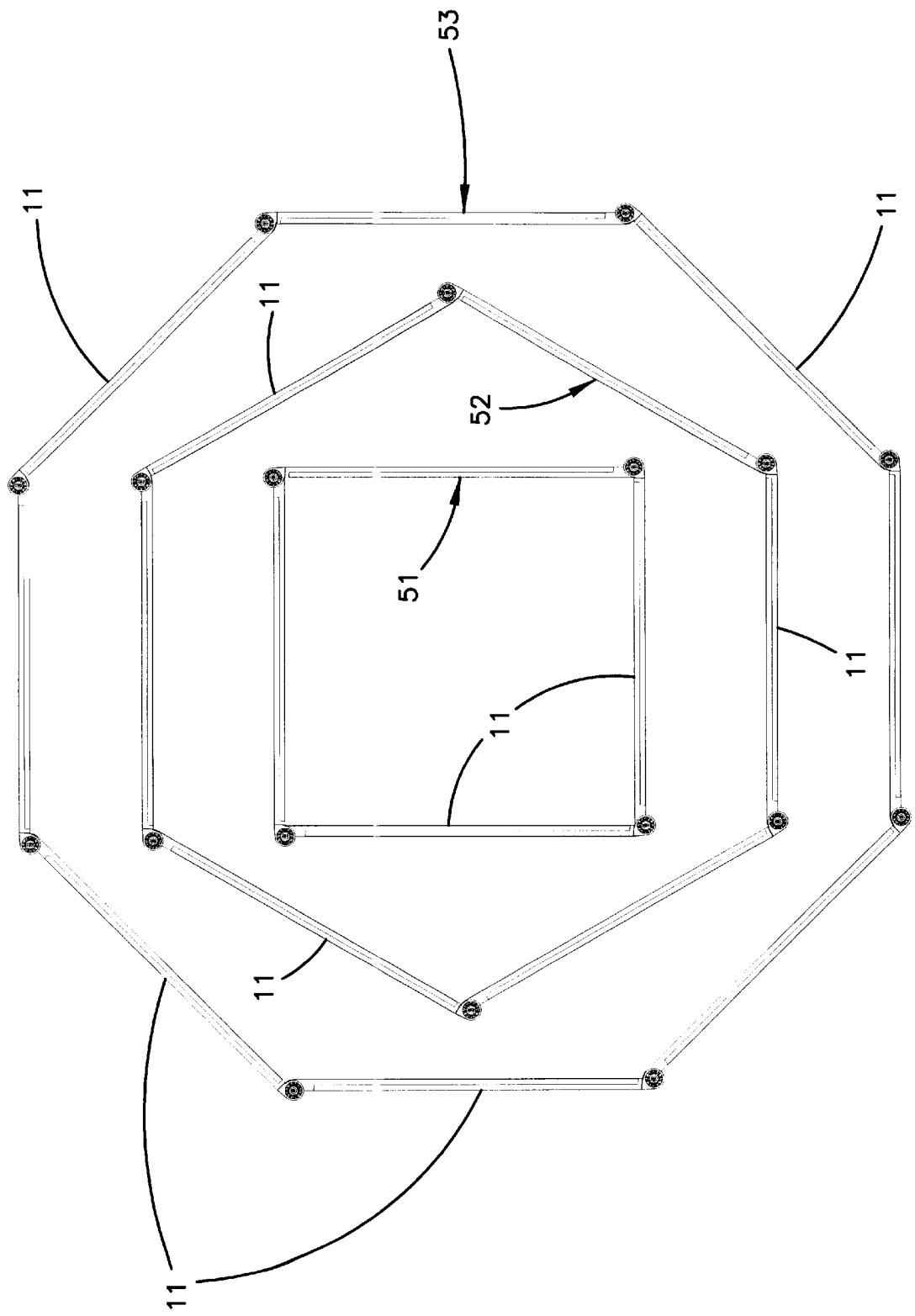
FIG. 15 is a top plan view of three different multiple panel combinations defining play areas.

It will be noted that the hinge member 17, and particularly the circular flange members 46, 47, are laterally offset relative to the vertical frame component 12e. As shown in FIGS. 3 and 15, the hinge members 15, 16 are laterally offset relative to the vertical frame component 12g by an equivalent amount. This enables adjacent panels to be folded into a nested, face-to-face relation as shown in FIG. 14, as will be described more fully below.

In operation, an even number of identical panels 11 may be used to define an enclosure for children or pets. With reference to FIG. 15, a four-sided enclosure is represented by the numeral 51, a six-sided enclosure is represented by the numeral 52 and an eight-sided enclosure is represented by the numeral 53. An odd number of panels may be used to form a partial enclosure or barricade.

Because of the unique construction of each of the panels 11, it is necessary only to reverse alternating panels top to bottom (i.e., every other panel is right side up with alternating panels upside down). Adjacent panels are interconnected simply by placing the flange 46 of hinge member 17 over the spindle 37 of the engagement member 33 of the adjacent panel 11 and forcing the engagement member 33 to retract into the hinge member 16. As this is done, the spindle 47a of flange 47 of hinge member 17 is inserted into the tapered recess 27 of the associated hinge member 15 and forcing the spindle 47a laterally inward until it enters the opening 18b in end member 18. In so doing, the interposed gear teeth 18a and 47b interlock, as do the interposed gear teeth 36 and 46a. The adjacent panels 11 are now interlocked at a relative angle that may or may not be appropriate to the desired configuration (e.g., square, hexagonal, octagonal or the like). The angle may be easily changed simply by moving the adjacent panels 11 angularly together or apart, as the case may be. This is facilitated by the rounded edges of the respective interlocking gear teeth. The angle is changed one gear at a time until the desired relative angle is obtained. Additional panels 11 are then added in the same manner in a number that accomplishes the desired size, and the enclosure is completed by interlocking the final two panels in the manner described above.

When the panels are completely interlocked into an enclosure, the resulting enclosure is strong, stable and capable of inhibiting the movement of children or pets.

In addition, because of the unique relationship between interlocking adjacent panels, and in particular the offset of the hinge members, the enclosure need not be completely disassembled for storage. Rather, only two adjacent panels are disconnected, and the remaining panels may be angularly folded and stored in parallel, flat face-to-face relation as described above.

We claim:

1. A panel usable in pluralities for forming a security enclosure for children and pets, the panel comprising:
   a panel body having opposed inner and outer faces and first and second opposite sides;
   first hinge means disposed on said first side, said first hinge means comprising first and second hinge members disposed on said first side of the panel body in vertically spaced relation; and
   second hinge means disposed on said second side, said second hinge means comprising a third hinge member having a vertical dimension the approximates the vertically spaced distance between the first and second hinge members;
   wherein one of the first and third hinge members comprises a first spindle and the other comprises a first spindle opening sized to receive the first spindle;
   the second hinge member comprises a stationary receptacle member and a telescoping spring loaded moveable engagement member having an outer diameter that is slightly less than the inside diameter of the second hinge member that is normally urged outward of said receptacle and capable of being forcibly retracted into said receptacle; and
   one of the engagement member and third hinge members comprises a second spindle and the other comprises a second spindle opening sized and disposed to receive the second spindle, the engagement member being retracted when the second spindle is forcibly placed into the second spindle opening, permitting the first spindle to be placed into the first spindle opening.

2. The panel body defined by claim 1, wherein the panel body comprises rectangular external frame means with a web portion carried within the external frame means.

3. The panel defined by claim 2, wherein the web portion comprises a gridwork with a plurality of openings therethrough sized and configured to prevent the passage of children and pets.

4. The panel defined by claim 3, wherein the gridwork and openings are diamond shaped.

5. The panel body defined by claim 1, wherein the third hinge member has first and second vertical ends, the first spindle being disposed on the first end of the third hinge member and the second spindle opening being disposed on the second vertical end of the third hinge member.

6. The panel body defined by claim 1, which further comprises a circular array of radially extending gear teeth surrounding each of said first and second spindles and first and second spindle openings, the respective arrays of gear teeth being disposed to engage and hold adjacent interlockably connected panel bodies in a particular gear engagement and predetermined angular relationship, and said gear teeth being arranged to permit one panel to be rotated to a different gear engagement relative to an adjacent panel to vary the angular relationship therebetween.

7. The panel defined by claim 6, wherein the top surfaces of the individual gear teeth are rounded to facilitate angular adjustment between adjacent panels.

8. The panel body defined by claim 1, which further comprises retention means for holding adjacent panels in a predetermined relative angular relationship, and for permitting adjustments to said predetermined relative angular relationship.

9. The panel defined by claim 8, wherein the retention means comprises gear means associated with the first and second hinge means, the gear means being constructed and arranged to respectively engage in a selected gear position, and to be releasably moveable to other selected gear positions.

10. The panel defined by claim 1, wherein:
   the first and second hinge members are laterally offset from one of the inner and outer faces of the panel body and the third hinge member is laterally offset in the opposite direction from the other of said inner and outer faces, whereby interlockably connected adjacent panels may be folded in substantially flat face-to-face relation.

* * * * *